Dec. 8, 1925.

H. G. DOTTERER

EGG TRAY

Filed March 30, 1925

1,564,217

Inventor
H. G. Dotterer,
By Clarence O'Brien
Attorney

Patented Dec. 8, 1925.

1,564,217

UNITED STATES PATENT OFFICE.

HARRISON G. DOTTERER, OF KOKOMO, INDIANA.

EGG TRAY.

Application filed March 30, 1925. Serial No. 19,427.

*To all whom it may concern:*

Be it known that I, HARRISON G. DOTTERER, a citizen of the United States, residing at Kokomo, in the county of Howard and State of Indiana, have invented certain new and useful Improvements in Egg Trays, of which the following is a specification.

This invention relates to an improved egg tray for incubator use, the same having reference to that class of tray composed of separable members between which a multiplicity of eggs are held, so that all of the eggs may be turned over at one time.

The invention has more specific reference to an egg holding tray made up of spaced plates having holes disposed in alignment with each other, and adapted for reception of the ends of the eggs, these plates being connected together in a manner to prevent possible crushing of the eggs, and the tray being of such construction that the eggs are uniformly and properly aerated.

Other features and advantages derived from the particular construction utilized will become apparent from the following description and drawings.

In the accompanying drawing, forming a part of this application, and in which like numerals are employed to designate like parts throughout the same.

Figure 3:
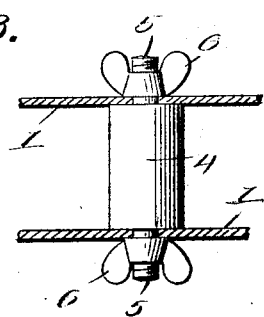
Figure 3 is a similar view, showing the spacing means more in detail.

In carrying out the invention, I employ a pair of upper and lower plates 1, of duplicate construction, these plates being provided around their edges with angularly directed peripheral flanges 2, serving to increase the rigidity of structure and constituting a means for slidably supporting the tray upon the customary cleats in the incubator. The plates are provided with opposite holes, in registry with each other, shaped and sized to accommodate the butts of the eggs 3. The eggs will preferably be separated into proper grades, so that there will be little likelihood of breakage from being crushed between the plates. In order to maintain the plates in the proper spaced relation to accommodate the graded eggs, I employ a plurality of duplicate spacing members 4. These are preferably of cylindrical formation, having flat ends against which the plates bear, as shown clearly in Figure 3. The members are equipped at their opposite ends with screw threaded studs 5, upon which thumb nuts 6 are screwed. In this way, it will be seen that the space between the opposed plates will be uniform throughout. Consequently, the air circulation between the plates will be thoroughly uniform and will contact all of the eggs in a like manner. By employing a tray of this open work design, the eggs will mature more rapidly, and substantially the total surface of each shell will be exposed to the circulating air.

While I have described the spacing members 4 as being of a particular design, I wish it to be understood that they might be in the form of sleeves and bolts, or bolts threaded at their opposite ends may pass through these spacing members clearing the thumb nuts as shown. Also, other variations in structure, coming within the field of invention claimed may be resorted to, if desired.

It is thought that by carefully considering the description, in connection with the drawing, persons skilled in the industry to which the invention relates will be able to obtain a clear understanding of the invention and will also comprehend the advantages thereof over the commonly marketed trays now known to the trade.

Figure 1:
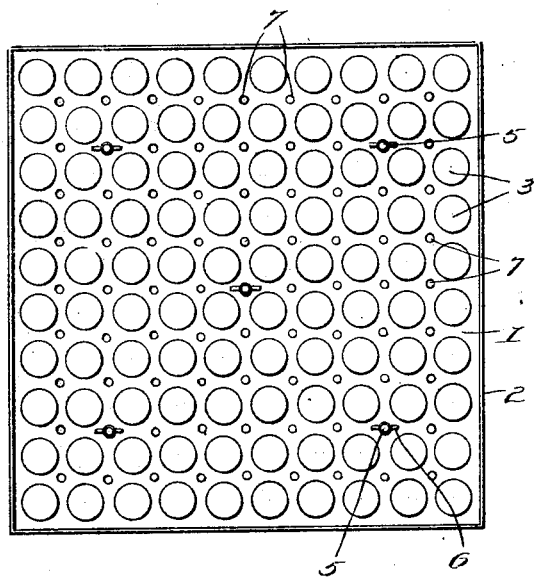
Figure 1 is a top plan view of an egg tray, constructed in accordance with the present invention, and showing the eggs in position therein.
Figure 2:
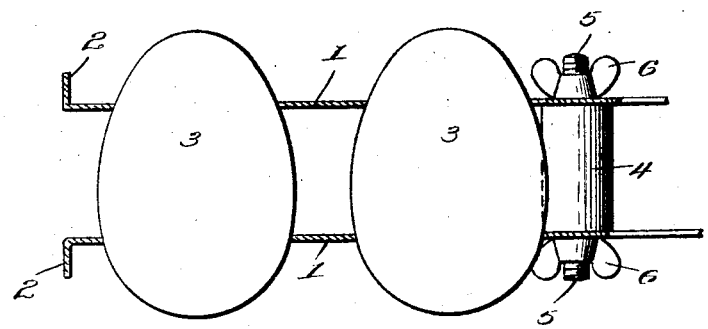
Figure 2 is an enlarged detail section, showing the assemblage more clearly.

Attention is further directed to the fact that as shown in Figure 1, the plates are provided with relatively small apertures 7, through which air may pass. This enhances the air circulation in the incubator, and it has been found in practice that a tray of the type specified not only facilitates the incubating action, but renders the use of the incubator more successful, in that it does not interfere with the circulation of the air, which is a very noticeable objection to the common form of incubators and shelves and trays used therein.

I claim:

1. An egg tray comprising a pair of spaced plates provided with registering holes adapted for reception of the ends of the eggs adapted to be clamped between said plates, said plates being provided with angularly disposed marginal flanges extending outwardly in opposite directions, and spacing means between the plates including means for connecting the plates together in assembled relation.

2. An egg tray of the class described comprising a pair of spaced superposed plates provided with registering egg holes, said plates being provided with marginal angularly disposed flanges directed in opposite directions, spacing members located between said plates and including threaded means extending through and beyond opposite sides of the plate, and thumb nuts carried by said threaded means and adapted to abut the plate.

In testimony whereof I affix my signature.

HARRISON G. DOTTERER.